United States Patent [19]

Smart

[11] Patent Number: 5,614,977
[45] Date of Patent: Mar. 25, 1997

[54] MANUAL FILM WIND THUMBWHEEL FOR CAMERA

[75] Inventor: David C. Smart, Rochester, N.Y.

[73] Assignee: Eastman Kodak Company, Rochester, N.Y.

[21] Appl. No.: 605,239

[22] Filed: Feb. 9, 1996

[51] Int. Cl.⁶ ............................................. G03B 1/00
[52] U.S. Cl. ................................. 396/395; 396/411
[58] Field of Search .......................... 354/202, 212, 354/213, 288

[56] References Cited

U.S. PATENT DOCUMENTS

| | | | |
|---|---|---|---|
| 4,509,097 | 4/1985 | Robinson | 361/395 |
| 4,949,111 | 8/1990 | Alligood | 354/213 |
| 5,461,438 | 10/1995 | Hargrave | 354/62 |

Primary Examiner—Safet Metjahic
Assistant Examiner—Eddie C. Lee
Attorney, Agent, or Firm—Roger A. Fields

[57] ABSTRACT

A manually rotatable film wind thumbwheel for a camera comprising a peripheral series of interdental spaces having a uniform pitch, is characterized in that a continuous series of finger-receiving indentations is located adjacent the peripheral series of interdental spaces and has a uniform pitch which is greater than the uniform pitch of the interdental spaces to permit the finger-receiving indentations to be more easily fingered than the interdental spaces to manually rotate the thumbwheel, whereby the interdental spaces can be used as locking spaces which individually receive a film metering pawl of the camera to arrest the thumbwheel and/or an anti-backup pawl to prevent counter-rotation of the thumbwheel.

12 Claims, 3 Drawing Sheets

5,614,977

MANUAL FILM WIND THUMBWHEEL FOR CAMERA

FIELD OF THE INVENTION

The invention relates generally to the field of photography, and in particular to a manually rotatable film wind thumbwheel for a camera.

BACKGROUND OF THE INVENTION

It is well known for relatively simple cameras, such as recent one-time-use cameras, to include a manual film wind thumbwheel that is rotatable in engagement with a film spool to similarly rotate the spool to take-up a filmstrip. In most one-time-use cameras, the spool is part of a film cartridge and is rotatable inside the cartridge shell to take-up successive exposed frames of the filmstrip.

Typically, the thumbwheel includes a peripheral series of interdental spaces which are intended to be stroked by one's thumb to grip the peripheral edge of the thumbwheel and windingly rotate the thumbwheel. In some one-time-use cameras, the interdental spaces are located partially inside and partially outside the camera housing.

If a film metering pawl inside the camera was to be located to pivot into one of the interdental spaces to arrest the thumbwheel each time a fresh frame of the filmstrip is positioned for exposure, the interdental spaces would need to be made fairly shallow and narrow to accommodate the relatively small pawl. The film metering pawl would be moved out of the interdental space after the film frame is exposed, to permit the thumbwheel to be rotated to rotate the spool to take-up the exposed frame, However, it would be difficult for one's thumb to grip the peripheral edge of the thumbwheel and windingly rotate the thumbwheel when the interdental spaces are made fairly shallow and narrow.

If an anti-backup pawl inside the camera housing was to be urged into successive ones of the interdental spaces to prevent counter-rotation of the thumbwheel, the interdental spaces would need to be made fairly shallow and narrow to accommodate the relatively small pawl. Thus, the same problem as in the example of the film metering pawl will occur.

SUMMARY OF THE INVENTION

A manually rotatable film wind thumbwheel for a camera comprising a peripheral series of interdental spaces having a uniform pitch, is characterized in that:

a continuous series of finger-receiving indentations is located adjacent the peripheral series of interdental spaces and has a uniform pitch which is greater than the uniform pitch of the interdental spaces to permit the finger-receiving indentations to be more easily fingered than the interdental spaces to manually rotate the thumbwheel, whereby the interdental spaces can be used as locking spaces which individually receive a film metering pawl of the camera to arrest the thumbwheel and/or an anti-backup pawl to prevent counter-rotation of the thumbwheel.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
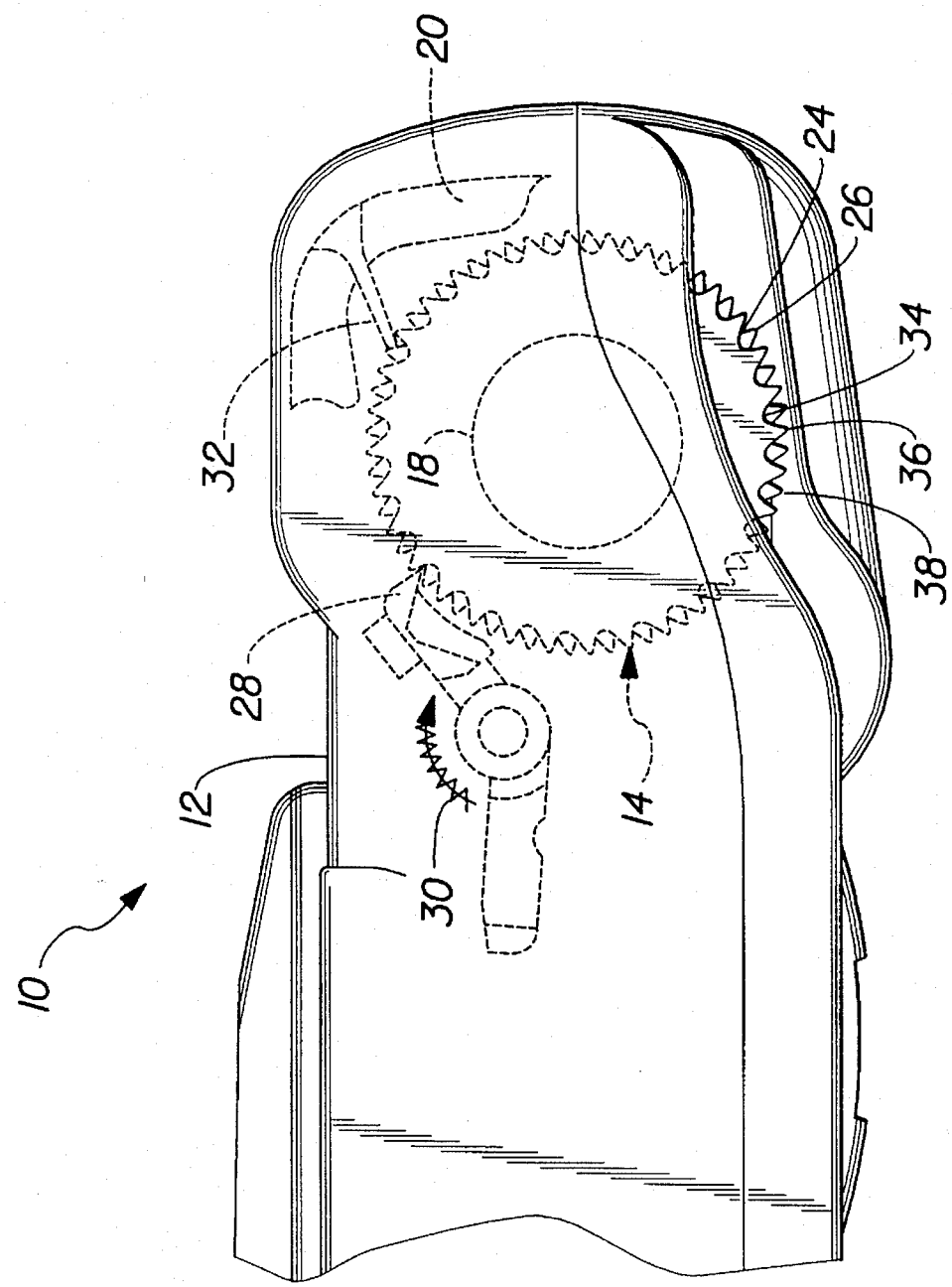
FIG. 1 is a top plan view of a camera with a manual film wind thumbwheel according to a preferred embodiment of the invention.
Figure 2:
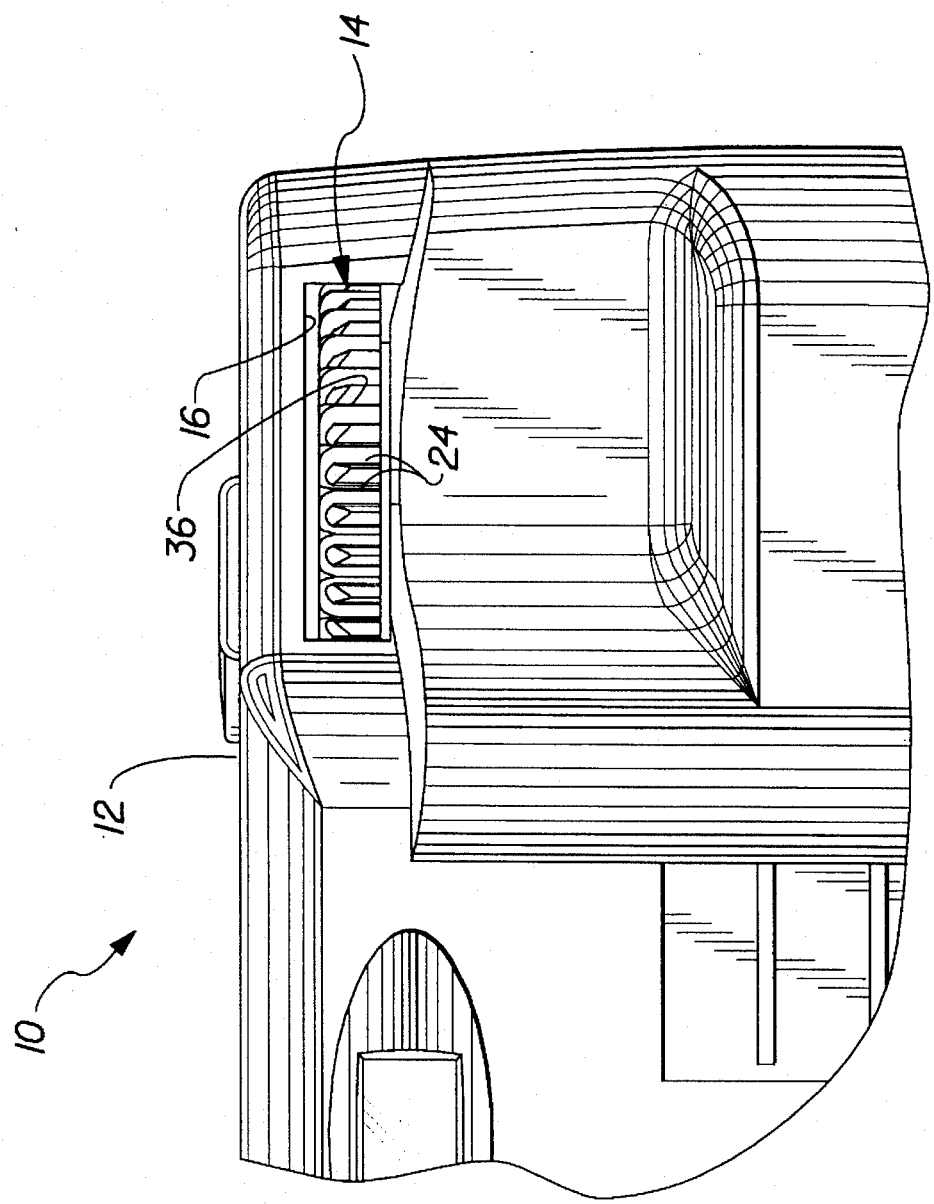
FIG. 2 is a rear elevation view of the camera including the thumbwheel.

Referring now to the drawings, FIGS. 1 and 2 show a portion of a one-time-use camera 10 having a camera housing 12. A manual film wind thumbwheel 14 is located partially inside and partially outside the camera housing 12. The thumbwheel 14 protrudes outside the camera housing 12 through a slot 16 in the camera housing.

The thumbwheel 14 has an integral bearing 18 which is rotatably supported by a portion (not shown) of an internal camera frame 20, and it has a depending coaxial drive stem 22 which is engaged with the spool of a film cartridge (not shown). See FIG. 3. Manual rotation of the thumbwheel 14 in a film winding direction rotates the spool to take-up successive exposed frames of a filmstrip (not shown) inside the camera housing 12.

Figure 3:
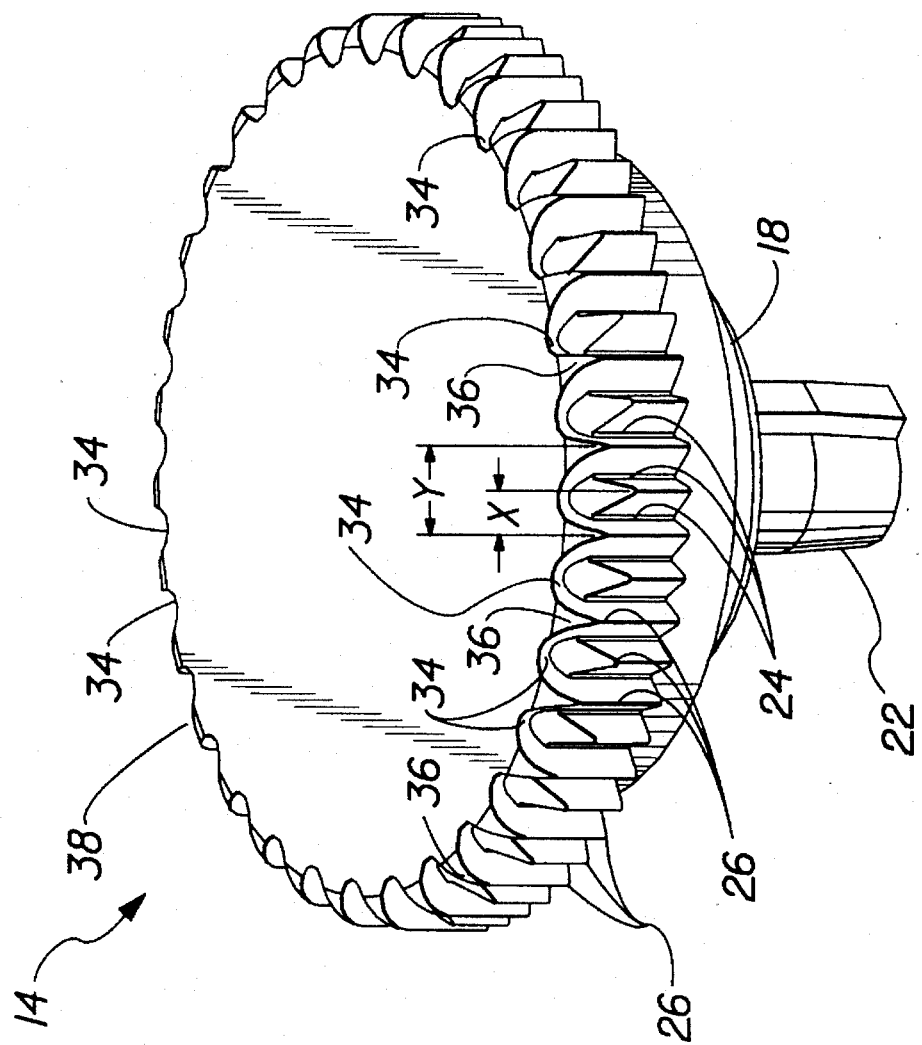
FIG. 3 is a top perspective view of the thumbwheel.

The thumbwheel 14 includes a peripheral series of identical interdental spaces 24 having a uniform pitch X as shown in FIG. 3. The interdental spaces 24 define identical individual teeth 26 between respective pairs of the interdental spaces. A known type film metering pawl 28 inside the camera housing 12 is urged via a spring 30 to pivot into individual ones of the interdental spaces 24 to engage corresponding ones of the teeth 26 to arrest the thumbwheel 14 to prevent its winding rotation, i.e. in the film winding direction. See FIG. 1. A known type resilient anti-backup pawl 32 inside the camera housing 12 is inherently urged into individual ones of the interdental spaces 24 to engage corresponding ones of the teeth 26 to prevent counter-rotation (opposite to winding rotation) of the thumbwheel 14.

The thumbwheel 14 includes a continuous series of identical finger-receiving indentations 34 which define identical individual teeth 36 between respective pairs of the finger-receiving indentations. The finger-receiving indentations 34 are intended to be stroked by one's thumb to provide a grip to windingly rotate the thumbwheel 14.

The finger-receiving indentations 34 have a uniform pitch Y which preferably is twice the uniform pitch X of the interdental spaces 24, and the total number of the finger-receiving indentations preferably is one half the total number of the interdental spaces. However, other pitch-to-pitch ratios can be used, and the total number of the interdental spaces 24 need only be a natural number multiple (2X, 3X, etc.) of the total number of the finger-receiving indentations 34.

As can be seen in FIG. 3, each one of the finger-receiving indentations 34 spans respective pairs of the interdental spaces 24 to make the peripheral teeth 36 which the finger-receiving indentations define be partly coextensive with every other one of the peripheral teeth 26 which the interdental spaces define. The peripheral teeth 26 which the interdental spaces 24 define are peripherally aligned (along a peripheral edge 38 of the thumbwheel 14) with the peripheral teeth 36 which the finger-receiving indentations 34 define. In essence, the interdental spaces 24 are substantially narrower and radially shallower than the finger-receiving indentations 34. The finger-receiving indentations 34 extend peripherally inward of respective ones of the interdental spaces 24.

Accordingly, the physical relationship between the interdental spaces 24 and the finger-receiving spaces 34 allows the interdental spaces to be used as locking spaces which individually receive the film metering pawl 28 and the anti-backup pawl 32 and allows the finger-receiving indentations to be more easily fingered than the interdental spaces to manually rotate the thumbwheel 14.

The invention has been described with reference to a preferred embodiment. However, it will be appreciated that variations and modifications can be effected by a person of ordinary skill in the art without departing from the scope of the invention.

PARTS LIST 10. one-time-use camera
12. camera housing
14. film wind thumbwheel
16. slot
18. bearing
20. frame
22. drive stem
24. interdental spaces
26. teeth
28. film metering pawl
30. spring
32. anti-backup pawl
34. finger-receiving indentations
36. teeth
38. peripheral edge
X. pitch
Y. pitch

I claim:

1. A manually rotatable film wind thumbwheel for a camera comprising a peripheral series of interdental spaces having a uniform pitch, is characterized in that:

a continuous series of finger-receiving indentations is located adjacent said peripheral series of interdental spaces and has a uniform pitch which is greater than the uniform pitch of the interdental spaces to permit said finger-receiving indentations to be more easily fingered than the interdental spaces to manually rotate said thumbwheel, whereby said interdental spaces can be used as locking spaces which individually receive a film metering pawl of the camera to arrest said thumbwheel and/or an anti-backup pawl to prevent counter-rotation of the thumbwheel.

2. A film wind thumbwheel as recited in claim 1, wherein each one of said finger-receiving indentations extend peripherally inward of respective ones of said interdental spaces on said thumbwheel.

3. A film wind thumbwheel as recited in claim 1, wherein the relationship in quantity between said finger-receiving indentations and said interdental spaces is a ratio of at least 1:2 respectively.

4. A film wind thumbwheel as recited in claim 1, wherein the uniform pitch of said finger-receiving indentations is at least twice the uniform pitch of the interdental spaces and each one of the finger-receiving indentations spans at least respective pairs of the interdental spaces.

5. A film wind thumbwheel as recited in claim 1, wherein said interdental spaces are substantially narrower and radially shallower than said finger-receiving indentations.

6. A film wind thumbwheel as recited in claim 1, wherein the total number of said interdental spaces is a natural number multiple of at least two times the total number of said finger-receiving indentations.

7. A film wind thumbwheel as recited in claim 1, wherein said interdental spaces define individual peripheral teeth between respective pairs of the interdental spaces, and said finger-receiving indentations define individual peripheral teeth between respective pairs of the finger-receiving indentations.

8. A film wind thumbwheel as recited in claim 7, wherein said peripheral teeth which said finger-receiving indentations define are peripherally aligned on said thumbwheel with said peripheral teeth which said interdental spaces define.

9. A film wind thumbwheel as recited in claim 7, wherein each one of said finger-receiving indentations spans at least respective pairs of said interdental spaces to make said peripheral teeth which the finger-receiving indentations define be partly coextensive with every other one of said peripheral teeth which the interdental spaces define.

10. A camera comprising a housing, a manually rotatable film wind thumbwheel including a peripheral series of interdental spaces located partially inside and partially outside said housing and having a uniform pitch, and a film metering pawl located inside said housing, is characterized in that:

said film metering pawl is urged into individual ones of said interdental spaces inside said housing to arrest said thumbwheel; and said thumbwheel includes a continuous series of finger-receiving indentations located adjacent said peripheral series of interdental spaces and having a uniform pitch which is greater than the uniform pitch of the interdental spaces to permit said finger-receiving indentations to be more easily fingered outside said housing than the interdental spaces to manually rotate said thumbwheel.

11. A camera as recited in claim 10, wherein an anti-backup pawl is urged into individual ones of said interdental spaces inside said camera to prevent counter-rotation of said thumbwheel.

12. A camera as recited in claim 11, wherein each one of said finger-receiving indentations spans at least respective pairs of said interdental spaces.

* * * * *